United States Patent
Adrian et al.

(10) Patent No.: US 11,514,379 B2
(45) Date of Patent: Nov. 29, 2022

(54) WORK ASSIGNMENT QUEUE ELIMINATION

(71) Applicant: BMC Software, Inc., Houston, TX (US)

(72) Inventors: Thomas L. Adrian, Dublin, CA (US); Sun Chun Chu, Richmond Hill (CA); Steve Wong, Markham (CA); Mark Thompson, Palo Alto, CA (US); Jek Wong, Brooklin (CA); Artemios Tavoularis, Whitby (CA); Cedric Young, Markham (CA)

(73) Assignee: BMC Software, Inc., Houston, TX (US)

( * ) Notice: Subject to any disclaimer, the term of this patent is extended or adjusted under 35 U.S.C. 154(b) by 376 days.

(21) Appl. No.: 13/929,351

(22) Filed: Jun. 27, 2013

(65) Prior Publication Data
US 2014/0278646 A1 Sep. 18, 2014

Related U.S. Application Data

(60) Provisional application No. 61/800,541, filed on Mar. 15, 2013.

(51) Int. Cl.
*G06Q 10/06* (2012.01)
(52) U.S. Cl.
CPC .......................... *G06Q 10/063114* (2013.01)
(58) Field of Classification Search
CPC ............................................. G06Q 10/063114
See application file for complete search history.

(56) References Cited

U.S. PATENT DOCUMENTS

| | | | | | |
|---|---|---|---|---|---|
| 5,682,421 | A | * | 10/1997 | Glovitz | H04M 3/493 358/305 |
| 5,960,070 | A | * | 9/1999 | O'Donovan | H04M 15/00 379/114.01 |
| 6,002,760 | A | * | 12/1999 | Gisby | H04M 3/48 379/210.01 |
| 8,229,101 | B1 | * | 7/2012 | Williams | 379/266.04 |
| 2002/0141561 | A1 | * | 10/2002 | Duncan | H04L 51/26 379/220.01 |
| 2003/0095652 | A1 | * | 5/2003 | Mengshoel et al. | 379/265.06 |

(Continued)

OTHER PUBLICATIONS

Mauricio A. Valle, Samuel Varas, Gonzalo A. Ruz, Job performance prediction in a call center using a naive Bayes classifier, Expert Systems with Applications, vol. 39, Issue 11, 2012, pp. 9939-9945, https://doi.org/10.1016/j.eswa.2011.11.126https://www.sciencedirect.com/science/article/pii/S0957 (Year: 2012).*

*Primary Examiner* — Eric W Stamber
*Assistant Examiner* — Alissa D Karmis
(74) *Attorney, Agent, or Firm* — Brake Hughes Bellermann LLP

(57) ABSTRACT

Described is a method for work assignment queue elimination. The method includes maintaining at least one data structure including an ordered list of ticket assignment rules and assignment result metrics, receiving a ticket indicating a system problem, assigning the ticket based on the ordered list of ticket assignment rules, the system problem and the assignment result metrics, collecting metrics based on the ticket assignment, and revising the assignment result metrics based on the collected metrics.

18 Claims, 10 Drawing Sheets

(56) References Cited

U.S. PATENT DOCUMENTS

| | | | | |
|---|---|---|---|---|
| 2003/0231647 | A1* | 12/2003 | Petrovykh | H04L 65/1069 370/429 |
| 2004/0202308 | A1* | 10/2004 | Baggenstoss | G06Q 10/06 379/265.06 |
| 2005/0125274 | A1* | 6/2005 | Nastacio et al. | 705/8 |
| 2006/0265090 | A1* | 11/2006 | Conway et al. | 700/94 |
| 2007/0299953 | A1* | 12/2007 | Walker | G06Q 10/06 709/223 |
| 2008/0118052 | A1* | 5/2008 | Houmaidi | H04M 3/5232 379/265.11 |
| 2010/0057519 | A1* | 3/2010 | Dorai | G06F 9/5033 705/7.13 |
| 2010/0332477 | A1* | 12/2010 | Jeffs et al. | 707/738 |
| 2012/0051536 | A1* | 3/2012 | Chishti | H04M 3/5175 379/265.06 |
| 2012/0102043 | A1* | 4/2012 | Verma | G06Q 30/02 707/748 |
| 2012/0224680 | A1* | 9/2012 | Spottiswoode | H04M 3/5232 379/265.11 |
| 2012/0323640 | A1* | 12/2012 | Sabharwal | G06Q 10/06398 705/7.39 |
| 2013/0054292 | A1* | 2/2013 | Gupta et al. | 705/7.15 |
| 2013/0111488 | A1* | 5/2013 | Gatti | G06Q 10/06 718/103 |
| 2013/0191185 | A1* | 7/2013 | Galvin | G06Q 10/10 705/7.37 |
| 2014/0140494 | A1* | 5/2014 | Zhakov | H04M 3/5183 379/265.03 |
| 2014/0146961 | A1* | 5/2014 | Ristock et al. | 379/265.12 |

* cited by examiner

WORK ASSIGNMENT QUEUE ELIMINATION

This application claims the benefit of U.S. Provisional Patent Application 61/800,541 filed on Mar. 15, 2013 entitled Work Assignment Queue Elimination, the entire contents of which are incorporated herein by reference.

FIELD

Embodiments relate to trouble ticket work assignments.

BACKGROUND

Conventionally, most trouble ticket work assignment queue management systems take a simplistic approach to task assignment. Rules such as round robin, by number of assigned tickets, and the like are commonly utilized. More sophisticated system considers additional factors such as skill set, location, and the like. However, trouble ticket work assignment queue management systems suffer from several shortcomings. For example, in conventional trouble ticket work assignment queue management systems once a ticket is assigned to an agent, the agent needs to scan through all assigned tickets in order to determine the order of work (e.g., by highest priority). Scanning through all assigned tickets not only distracts the agent from focusing their work, which is to resolve ticket in timely manner, but could also jeopardize the organization objective because an individual's decision making process might not align with the organization's objective.

For example, in conventional trouble ticket work assignment queue management systems factors such as an individual's skill set, capability and availability may change over time. Conventional trouble ticket work assignment queue management systems rely on static data related to skills that are preset at install time or often left undefined (e.g. our skills listed are not updated with new acquired skills and/or lack any measurement of how well those skills may be applied). Further, conventional trouble ticket work assignment queue management systems lack the ability to adapt to dynamic metrics associated with an individual's skill set. This results in inaccurate assignment of work or requires manual system intervention.

For example, in conventional trouble ticket work assignment queue management systems when a ticket is assigned to an individual, there may be numerous factors that may jeopardize the progress of the individual's work. In the case where an organization is overloaded with work (and/or with an unbalanced workload) and a service objective is potentially under jeopardy, there is no automated tool available to aid a manager with remedying the situation. A manager may need to scan through a long list of tickets in order to understand the situation and determine who can take on the re-assigned work. This time consuming "triage" process not only further delays the resolution process, but also introduces human error because the manager could very easily overlook certain inter-related factors in a complex situation.

Accordingly, there is a need for a system that reduces and/or eliminates the need for queues as the primary interface for service desk/IT agents. There is also the need for reducing and/or minimizing time consuming ticket triaging that requires many resources.

SUMMARY

One embodiment includes a method for work assignment queue elimination. The method includes maintaining at least one data structure including an ordered list of ticket assignment rules and assignment result metrics, receiving a ticket indicating a system problem, assigning the ticket based on the ordered list of ticket assignment rules, the system problem and the assignment result metrics, collecting metrics based on the ticket assignment, and revising the assignment result metrics based on the collected metrics.

Another embodiment includes a system including a non-transitory computer readable medium. The non-transitory computer readable medium include code segments that when executed by a processor cause the processor to maintain at least one data structure including an ordered list of ticket assignment rules and assignment result metrics, receive a ticket indicating a system problem, assign the ticket based on the ordered list of ticket assignment rules, the system problem and the assignment result metrics, collect metrics based on the ticket assignment, and revise the assignment result metrics based on the collected metrics.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

Figure 1:
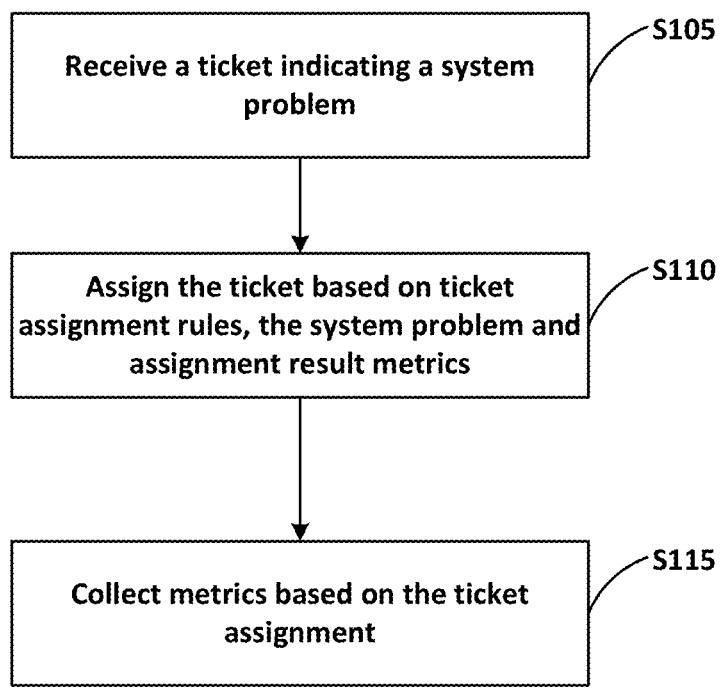
FIG. 1 illustrates a method for ticket assignment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION OF THE EMBODIMENTS

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Figure 10:
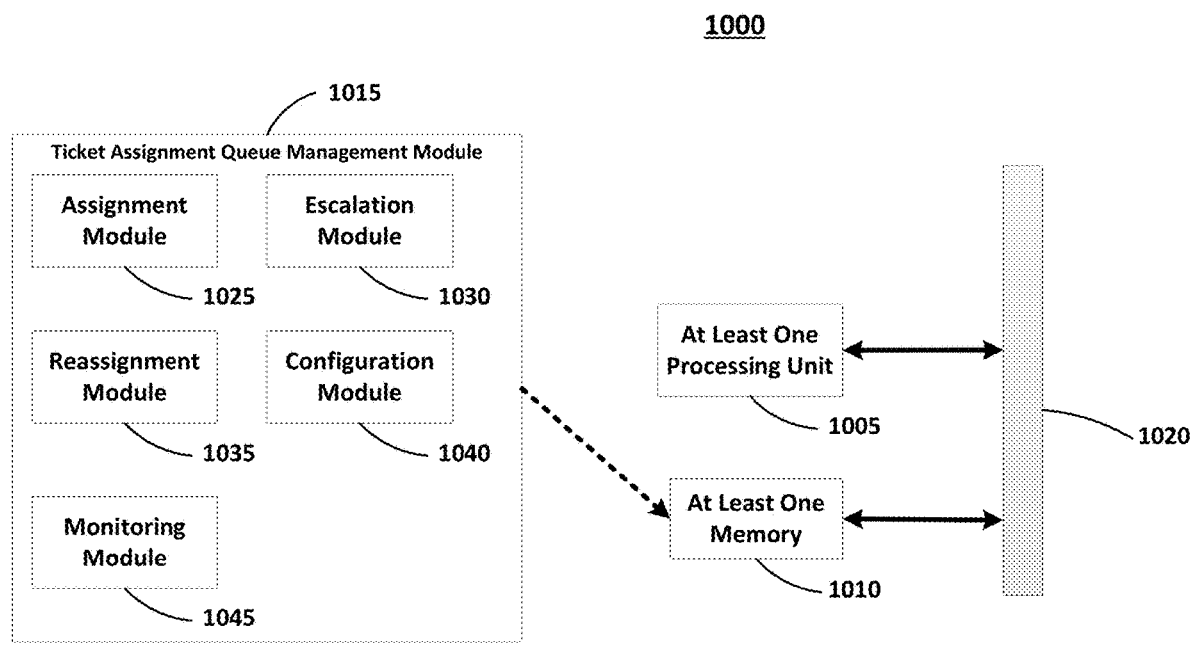
FIG. 10 illustrates a block diagram of an apparatus according to at least one example embodiment.

FIG. 1 illustrates a method for ticket assignment according to at least one example embodiment. The method steps described with regard to FIG. 1 may be executed as software code stored in a memory (e.g., at least one memory 1010 described below) associated with a system (e.g., as shown in FIG. 10) and executed by at least one processor (e.g., at least one processor 1005 described below) associated with the system. For example, the processor may be associated with one or more of the blocks (e.g., the business logic server 510, 610, 710 described below) or the apparatus 1000. However, alternative embodiments are contemplated such as a system embodied as a special purpose processor.

For example, the method steps may be performed by an application-specific integrated circuit, or ASIC. For example, the ASIC may be configured as one or more of the blocks, or elements of the blocks, (e.g., the business logic server 510, 610, 710 described below) and/or the apparatus 1000. Although the steps described below are described as being executed by a processor, the steps are not necessarily executed by a same processor. In other words, at least one processor may execute the steps described below with regard to FIG. 1.

As shown in FIG. 1, in step S105 a processor (e.g., at least one processing unit 1005) receives a ticket indicating a system problem. For example, a call desk may receive a call from a client indicating a problem. The call desk may enter the problem into a trouble ticket system which may generate a ticket and/or information about the problem. The trouble ticket system may communicate the ticket and/or the information to a server (including a processor) including a trouble ticket work assignment queue manager.

In step S110 the processor assigns the ticket based on ticket assignment rules, the system problem and assignment metrics. For example, a ticket may be assigned based on dates (e.g., due dates), location, priority, and the like. For example, a ticket may be assigned based on an agent's capacity (availability or skill set) to resolve the problem. For example, a ticket may be assigned based on how well an agent resolved a similar system problem in the past.

In step S115 the processor collects metrics based on the ticket assignment. For example, example embodiments may help improve trouble ticket work assignment by collecting metrics that may provide a self learning mechanism to track how well an agent (e.g., a service desk agent) may perform (or has performed) a specific job based on how well the agent resolved past incidents. The metrics may include the time to resolve a specific type of ticket, the kick back rate of the ticket, and the like. With this information being fed back to the system, example embodiments may help refine assignments and improve the assignment results over time.

Accordingly, example embodiments allow utilization of computed assignments to agents as the best selection that is not possible in a manual sorting of assignments (e.g., triage) without significant and overwhelming individual effort (such as looking up past historical performance or availability of other resources and their workload). For example, in a service desk agent environment, example embodiments may eliminate time consuming process of reviewing every new ticket coming to the service desk agent's queue in order to determine the order of work. Because tickets may be assigned to the service desk agent and pre-ordered based on the pre-configured organization objectives, agents may rely on the system and perform work based on the assignment knowing that the assignment may fulfill the organization objective.

In a trouble ticket work assignment queue manager (e.g. management of agent workloads to ensure tickets are resolved in an effective manner) environment, example embodiments may help improve trouble ticket work assignment by collecting metrics that may provide a self learning mechanism to track how well an agent (e.g., a service desk agent) may perform (or has performed) a specific job based on how well the agent resolved past incidents. The metrics may include the time to resolve a specific type of ticket, the kick back rate of the ticket, and the like. With this information being fed back to the system, example embodiments may help refine assignments and improve the assignment results over time.

The trouble ticket work assignment queue manager may also continuously monitor the capacity of all (most or a subset of) the agents to ensure tickets may be resolved within a target time (e.g., a completion target). For new or incoming tickets, ticket assignments may slot the ticket to the most qualified agent with adequate capacity to handle the new workload. The ticket may be slotted to the right working order to ensure (a) the ticket can be resolved within the target time and (b) the ticket does not jeopardize any of the existing tickets.

Capacity and skills management may take several inputs into account in determining if a person/group is at capacity and if they can take on additional work. Some of the inputs may be skills of the assignee, type of ticket being assigned to them (problem to be solved, work to be done, urgency of the ticket etc.), how long it has taken to do this type of ticket in the past, what the common criteria for completing this type of ticket is, user availability data, user location data, amount of other work that is assigned to them, and gets inputs (e.g., metrics) based on how long things may be taking to help dynamically build out how long different types of work should take. Capacity and skills management may also keep track of the skills that individual and groups have and accept input from metrics to help dynamically change agent skill sets (e.g., who is good at working on what).

Figure 2:
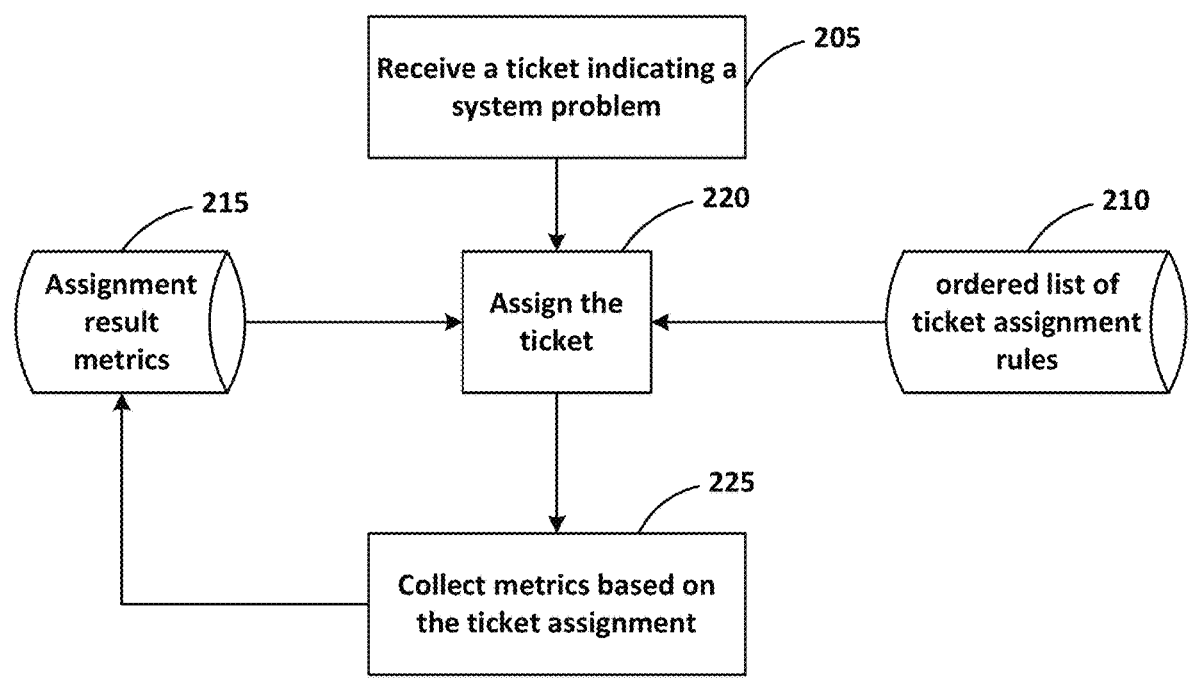
FIG. 2 illustrates a block diagram for ticket assignment according to one or more example embodiments.

Trouble ticket work assignment queue management may assign and re-organize a trouble ticket queue based on skills and capacity inputs. Assignment may take into account ticket location, group location, assignee location, skills, capacity, availability (now and in the future), target date, and priority FIG. 2 illustrates a block diagram for ticket assignment according to one or more example embodiments. According to example embodiments a ticket indicating a system problem is received (block 205). For example, a call desk may receive a call from a client indicating a problem. The call desk may enter the problem into a trouble ticket system which may generate a ticket and/or information about the problem. The trouble ticket system may communicate the ticket and/or the information to a server (including a processor) including a trouble ticket work assignment queue manager.

According to example embodiments the ticket is assigned (block 220). For example, ticket assignment may be based on a set of stored rules. The rules may be stored in a memory (e.g., a database) including an ordered list of ticket assignment rules (block 210). The rules may include rules based on dates (e.g., due dates), location, priority, and the like.

For example, ticket assignment may be based on metrics. The metrics may be stored in a memory (e.g., a database)

including assignment result metrics (block 215). For example, the metrics may include information about an agent's capacity (availability or skill set) to resolve the problem. For example, the metrics may include information about how well an agent resolved a similar system problem in the past. Accordingly, in block 220, example embodiments may assign a ticket based on information associated with the ordered list of ticket assignment rules (block 210) and the assignment result metrics (block 215).

According to example embodiments metrics are collected (block 225) based on the ticket assignment. For example, example embodiments may help improve trouble ticket work assignment by collecting metrics that may provide a self learning mechanism to track how well an agent (e.g., a service desk agent) may perform (or has performed) a specific job based on how well the agent resolved past incidents. The metrics may include the time to resolve a specific type of ticket, the kick back rate of the ticket, and the like. The information may include status of a currently assigned ticket (e.g., metrics as to whether the agent is working at or above capacity). With this information being fed back to the system, example embodiments may help refine assignments and improve the assignment results over time.

Metrics collection may include gathering information that may support an understanding of capacity and skills (of agents). Metrics may include time to complete different types of tickets (e.g., by type, by group, by individual (this may be a driver into the skills component to determine the level of skill an agent has to resolve a problem)), quality of the work (e.g., kickbacks, number of tickets created about the same issue after the first issue has been resolved, or failed changes to resolve an issue. This should also drive information into the skills and capabilities of an agent or group), and number of re-assignments.

Example embodiments may, based on objectives of the organization, allow managers to tailor ticket assignment based on a set of rules. According to example embodiments, once a rule is defined, the rule may be consistently used during initial assignment and re-assignment processes. When an individual is assigned to a ticket, an estimated start time may be assigned to the ticket in order to determine the order of work. With this additional information, the agent can confidently work on tickets based on the assigned order on the estimated start time. The agent no longer spends a significant amount of time managing the list of tickets on the agent's queue (e.g., performing a triage) to determine which ticket to work on first. A manager or management entity (e.g., an individual or group of individuals utilizing a user interface) may help monitor and optimize the distribution of work load to the manager's team member based on the rules.

Figure 3:
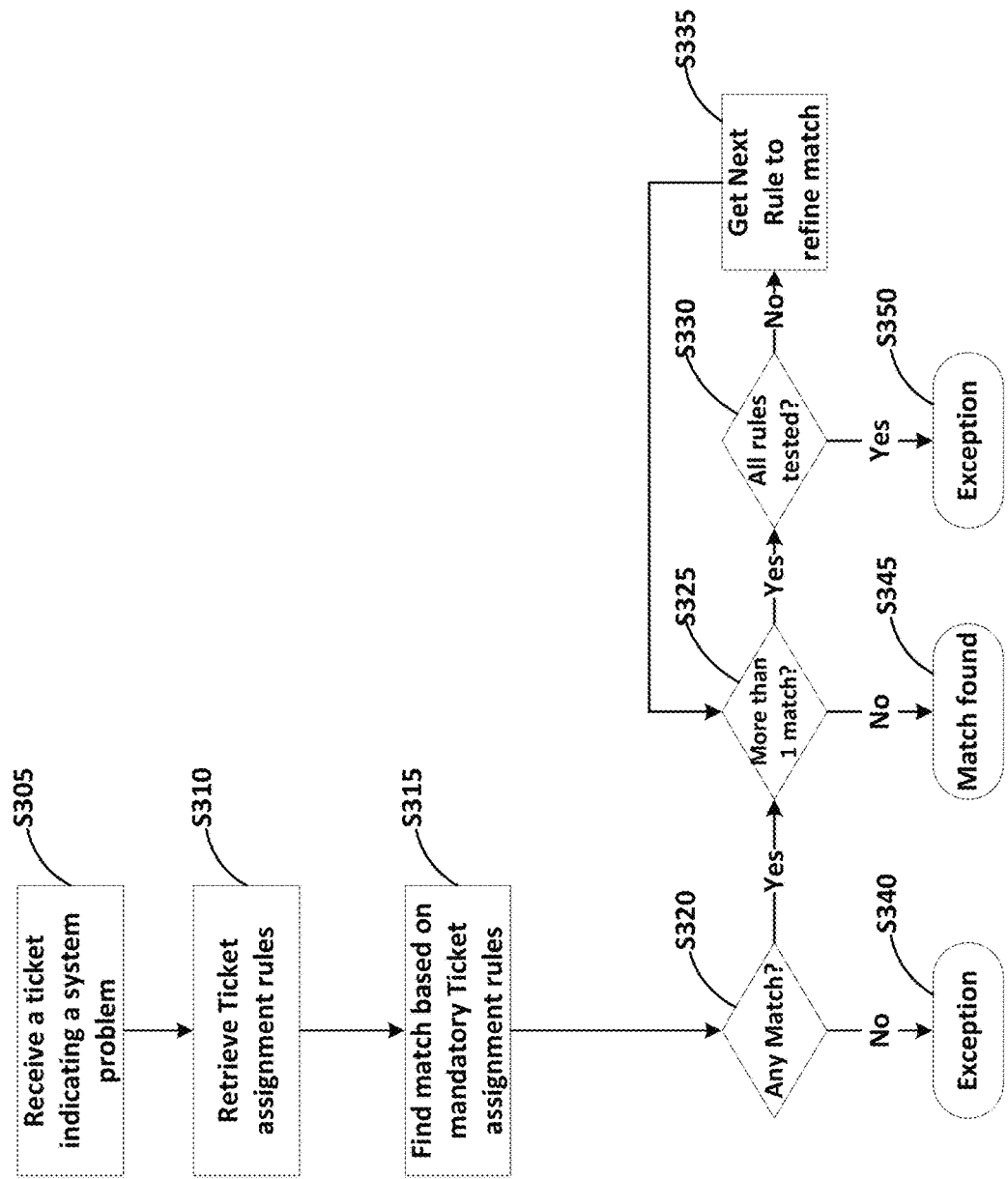
FIG. 3 illustrates a method for ticket assignment according to at least one example embodiment.

FIG. 3 illustrates a method for ticket assignment according to at least one example embodiment. The method steps described with regard to FIG. 3 may be executed as software code stored in a memory (e.g., at least one memory 1010 described below) associated with a system (e.g., as shown in FIG. 10) and executed by at least one processor (e.g., at least one processor 1005 described below) associated with the system. For example, the processor may be associated with one or more of the blocks (e.g., the business logic server 510, 610, 710 described below) or the apparatus 1000. However, alternative embodiments are contemplated such as a system embodied as a special purpose processor.

For example, the method steps may be performed by an application-specific integrated circuit, or ASIC. For example, the ASIC may be configured as one or more of the blocks, or elements of the blocks, (e.g., the business logic server 510, 610, 710 described below) and/or the apparatus 1000. Although the steps described below are described as being executed by a processor, the steps are not necessarily executed by a same processor. In other words, at least one processor may execute the steps described below with regard to FIG. 3.

As shown in FIG. 3, in step S305 a processor (e.g., at least one processing unit 1005) receives a ticket indicating a system problem. For example, a call desk may receive a call from a client indicating a problem. The call desk may enter the problem into a trouble ticket system which may generate a ticket and/or information about the problem. The trouble ticket system may communicate the ticket and/or the information to a server (including a processor) including a trouble ticket work assignment queue manager.

In step S310 the processor receives ticket assignment rules. For example, the processor may receive the ticket assignment rules from a memory (e.g., a database) including the ordered list of ticket assignment rules (block 210) For example, using one or more of the following example rules (1) Assign by Target Date (ensure tickets may be assigned to individual that is available to complete the work within the completion target date and/or time); (2) Assign by Work Load (ensure tickets may be assigned so that work center workload distribution may be evenly distributed among the group); (3) Assign by Location (ensure tickets may be assigned based on individual's location work is to be performed preference); (4) Assign by Skill Set (ensure tickets may be assigned based on best match of skill set); (5) Assign by Priority (ensure high priority tickets may be evenly distributed among individual within the group); and (6) Assign by Preferred Language (ensure agent is able to speak the same language as the customer). Additional detail regarding the ticket assignment rules are shown below in Table 1.

TABLE 1

| Method | Description |
| --- | --- |
| By Target date | May ensure ticket is assigned to the assignee that could meet the target date of the ticket. Factors that should be taken into consideration may be:<br>Target date of ticket<br>Estimate repair time of ticket<br>Availability of assignee |
| By Work load of assignee | May ensure ticket is assigned to the assignee with least workload |
| By Location | May ensure ticket is assigned based on the prefer location of the requestor. If assignee has specified restricted locations on the configuration, assignment engine should avoid assigning tickets that match these locations to the assignee. |
| By Skill Set | May ensure ticket is assigned to the assignee with best match skill set. If assignee has specified skill set that he/she does not have, assignment engine should avoid assigning tickets that match these skill set to the assignee. |
| By Priority | May ensure highest priority tickets are evenly distributed among assignees |

In step S315 the processor finds a match based on primary (or mandatory) ticket assignment rules. For example, one or more of the rules may be indicated as a primary rule. For example, Assign by Target Date may be indicated (tagged) as a primary rule. As a result, ticket assignment may include a look up of the agents to determine if there are any agents free within a time window resulting resolving the ticket by an assigned target date. Example embodiments are not limited to one primary ticket assignment rule. For example, in addition to Assign by Target Date, the primary ticket assignment rule may include Assign by Skill Set. As a result, ticket assignment may include a look up of the agents to determine if there are any agents free within a time window resulting resolving the ticket by an assigned target date and agents having the skill set to perform the work.

In step S320 the processor determines if any matches are found. In other words, the processor determines if any matches based on the primary ticket assignment rules are found. For example, the result of determining if there are any agents free within the time window may be zero (e.g., no agents are available within the time window), one agent is available, or more than one agent is available. In addition, the result may be that zero agents are available with the skill set to perform the work, one agent is available with the skill set to perform the work, or more than one agent is available with the skill set to perform the work. If no matches are found, processing moves to step S340. Otherwise, processing continues to step S325.

In step S325 the processor determines if more than one match is found. In other words, the processor determines if more than one agent match is found based on the primary ticket assignment rules. For example, more than one agent may be available within the time window. In addition, more than one agent may be available with the skill set to perform the work. If only one match is found, processing moves to step S345. Otherwise, processing continues to step S330.

In step S330 the processor determines if all ticket assignment rules have been tested. For example, six rules are listed above (noting that example embodiments are not limited to the above rules). If two of the rules are indicated as primary (e.g., Assign by Skill Set and Assign by Target Date), four rules remain that can be tested. Therefore, each of these remaining rules can be tested in combination with the primary rules. The rules may be tested individually and/or in combination. If all ticket assignment rules (e.g., six rules) have been tested, processing moves to step S350. Otherwise, processing continues to step S335.

In step S335 the processor gets a next ticket assignment rule and refines the match. For example, the next ticket assignment rule in a list of ticket assignment rules may be tested. For example, the ticket assignment rules may be ordered based on organization goals. For example, ensuring that a customer speaks to an agent with specific language skills may be important to the organization. As a result, Assign by Preferred Language may be higher in the ordered list than Assign by Work Load. Following match refinement, processing returns to step S325.

As an example, Table 2 below illustrates some user or agent characteristics including location of the user or agent.

TABLE 2

| User | Group | Type | Location |
|---|---|---|---|
| A | Service Desk | Prefer | X |
| A | Service Desk | Prefer | Y |
| A | Service Desk | Restricted | Z |
| B | Service Desk | Prefer | X |
| C | Service Desk | Restricted | X |

In an example, a ticket may be assigned based on location of the user or agent. For example, for ticket with location X, a preferred users may be A and B. For example, for ticket with location Y, a preferred user may be A. For example, for ticket with location Z, there is no preferred user for this location. Therefore, all users within the group may be qualified (except those with location Z set as restricted). In this case, B and C may be qualified. In other words, for users with no specific preferred or restricted locations, the indication for the user may configured as empty in order to simplify the work.

As another example, Table 3 below illustrates some user or agent characteristics including skill set and capacity of the user or agent.

TABLE 3

| User | Group | Op Cat 1 | Op Cat 2 | Op Cat 3 | Prod Cat 1 | Prod Cat 2 | Prod Cat 3 | Capacity |
|---|---|---|---|---|---|---|---|---|
| A | Service Desk | Failure | Functionality | Repair | Hardware | Telecom | | 120 |
| A | Service Desk | | | | Hardware | Process Unit | Laptop | 120 |
| A | Service Desk | Request | Server | Provision | | | | 80 |
| B | Service Desk | Request | Account | | | | | 140 |
| B | Service Desk | | | | Hardware | | | 0 |
| C | Service Desk | | | | Network | | | 0 |

Accordingly, for a ticket with a product category of Hardware/Process Unit/Laptop, user A may be the preferred pick, followed by user C. User B may not be picked because user B is marked as 0 capacity for Hardware type of work. For ticket with a product category of Hardware/Process Unit/Server, because there is no preferred or partial match among all the users within the group, all users in the group with the exception of B may have equal chance of getting assigned the ticket.

In step S340 the processor throws an exception. In other words, if no agents meet the requirements of the primary ticket assignment rule(s), alternative action is taken to assign the ticket for resolution. For example, if no agents are available (within the time window) with the skill set to perform the work, alternative assignment steps may be taken. For example, a manager may manually assign the ticket. For example, tickets may be reassigned to free an agent (within the time window) with the skill set to perform the work.

In step S345 the processor indicates that a match has been found. In other words, one agent meets the requirements of the primary ticket assignment rule(s). Therefore, the ticket may be assigned to the agent. For example, if one agent is available (within the time window) with the skill set to perform the work, a match is found and the ticket can be assigned to the matching agent.

In step S350 the processor throws an exception. In other words, more than one agent meets the requirements of the primary ticket assignment rule(s) and no additional ticket assignment rules exist to further refine the match. Therefore, alternative assignment steps may be taken. For example, a manager may manually assign the ticket to one of the matching agents.

As an example, a new ticket assigned to a support group with a target date of, for example, Jul. 15, 2013 8 PM. An estimated repair time (e.g., an elapsed time of 3 hours) may be looked-up based on, for example, similar ticket types. This means the latest start time to work on the new ticket is, for example, Jul. 15, 2013 5 PM. Assuming there are two primary rules defined (e.g., Assign by Target Date and Assign by Skill Set), the assignment may be based on a look up of all (most or a subset of) the agents within a group and find out if there may be any agents free within the window having the skill set to perform the work. For example, if five agents are found, matching may be refined based on the next rule which may be, for example, workload of the agents. Processing may calculate the total free time among these agents prior to, for example, Jul. 15, 2013 8 PM and pick the agent with the longest free time.

Figure 4:
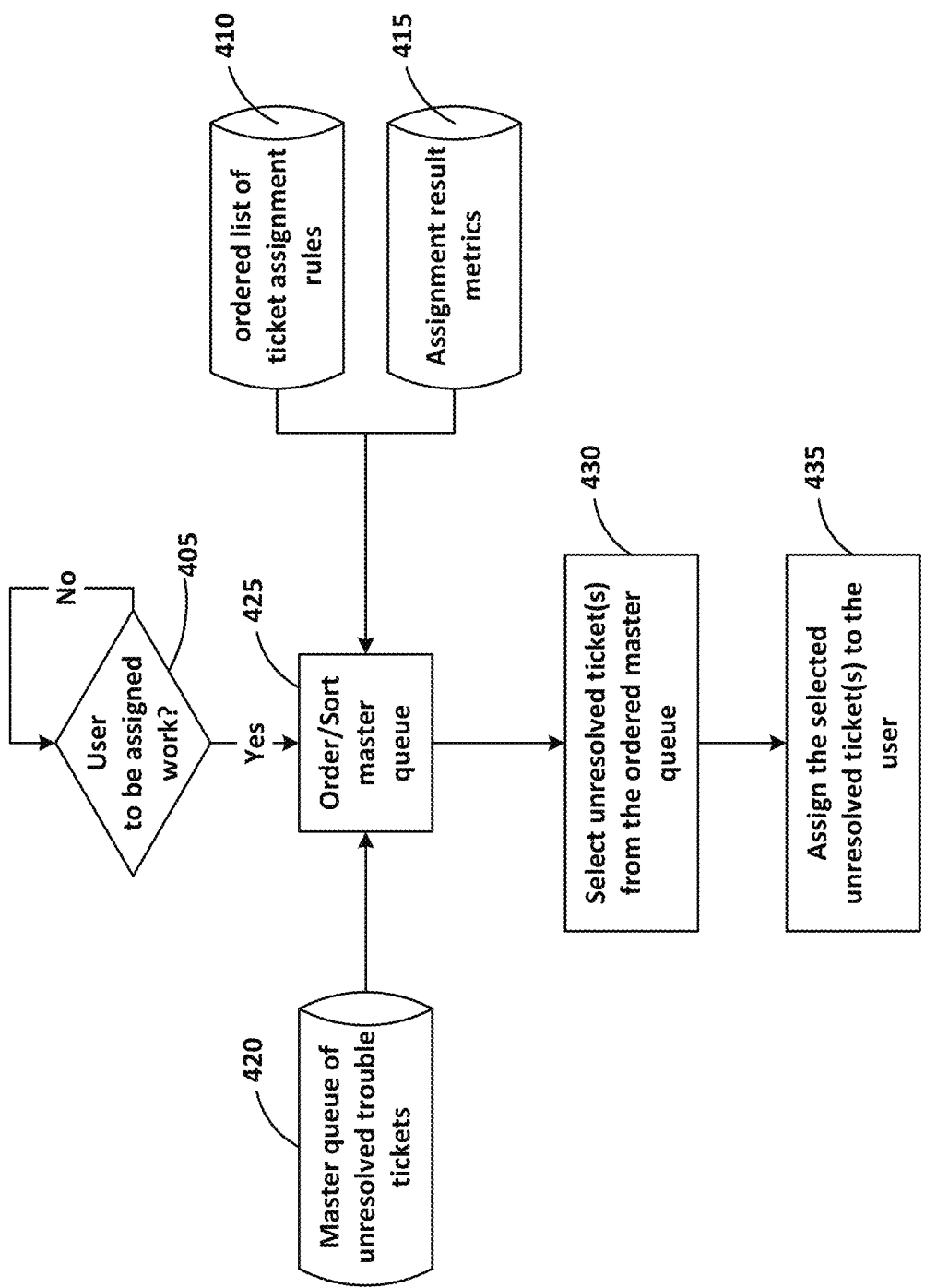
FIG. 4 illustrates a block diagram for ticket assignment according to one or more example embodiments.

FIG. 4 illustrates a block diagram for ticket assignment according to one or more example embodiments.

According to example embodiments a determination is made as to whether or not a user is to be assigned work (block 405). For example, an agent may indicate completion of a ticket or provide some other indication that the agent is free. For example the agent may use a user interface to indicate the agent is available for work assignment. If the user is to be assigned work, a master queue of tickets as a master queue of unresolved trouble tickets (block 420) is ordered and/or sorted (block 425). The master queue of unresolved trouble tickets (or unresolved tickets) may be stored in a memory (e.g., a database).

For example, sorting and/or ordering (e.g., placing tickets in a preferred sequence) the master queue of unresolved trouble tickets may be based on a set of stored rules. The rules may be stored in a memory (e.g., a database) including an ordered list of ticket assignment rules (block 410). The rules may include rules based on dates (e.g., due dates), location, priority, and the like. The sorting may be ordered such that the ordered list of ticket assignment rules dictates the first sort parameter, the second sort parameter and so forth. For example, the sorting may first be based on Assign by Target Date, then by Assign by Skill Set and so forth.

For example, sorting the master queue of unresolved trouble tickets may be based on metrics. The metrics may be stored in a memory (e.g., a database) including assignment result metrics (block 415). For example, the metrics may include information about an agent's capacity (availability or skill set) to resolve the problem. For example, the metrics may include information about how well an agent resolved a similar system problem in the past. For example, sorting by Assign by Skill Set may be further refined by the metrics. Accordingly, in block 4250, example embodiments may sorting the master queue of unresolved trouble tickets may be based on information associated with the ordered list of ticket assignment rules (block 410) and the assignment result metrics (block 415).

According to example embodiments unresolved ticket(s) tickets (or unresolved tickets) from the ordered and/or sorted master queue are selected (block 430). For example, the sorted master queue of unresolved trouble tickets may be ordered such that the best available (e.g., unresolved and unassigned) ticket for the user is on the top of the sorted master queue of unresolved trouble tickets. Therefore, the top ticket or tickets may be selected. The top ticket may be selected as an unresolved ticket to be allocated to an user or agent, for an allocation time period. According to example embodiments the selected unresolved ticket(s) from the ordered and/or sorted master queue are assigned to the user (block 435). For example, the selected best available (e.g., unresolved and unassigned) ticket(s) for the user is assigned to the user for completion during an allocation time period. For example, the allocation time period may include a start time and an end time.

The master queue of unresolved trouble tickets may be monitored to identify potential trouble areas. The monitoring may be directed to, for example, potential breaches based on target date, changes to the tickets that could affect how the queue is built, and changes to the availability of support staff. To develop this, an event driven process may be created to detect any potential breaching situation and alert a user/manager.

Figure 5:
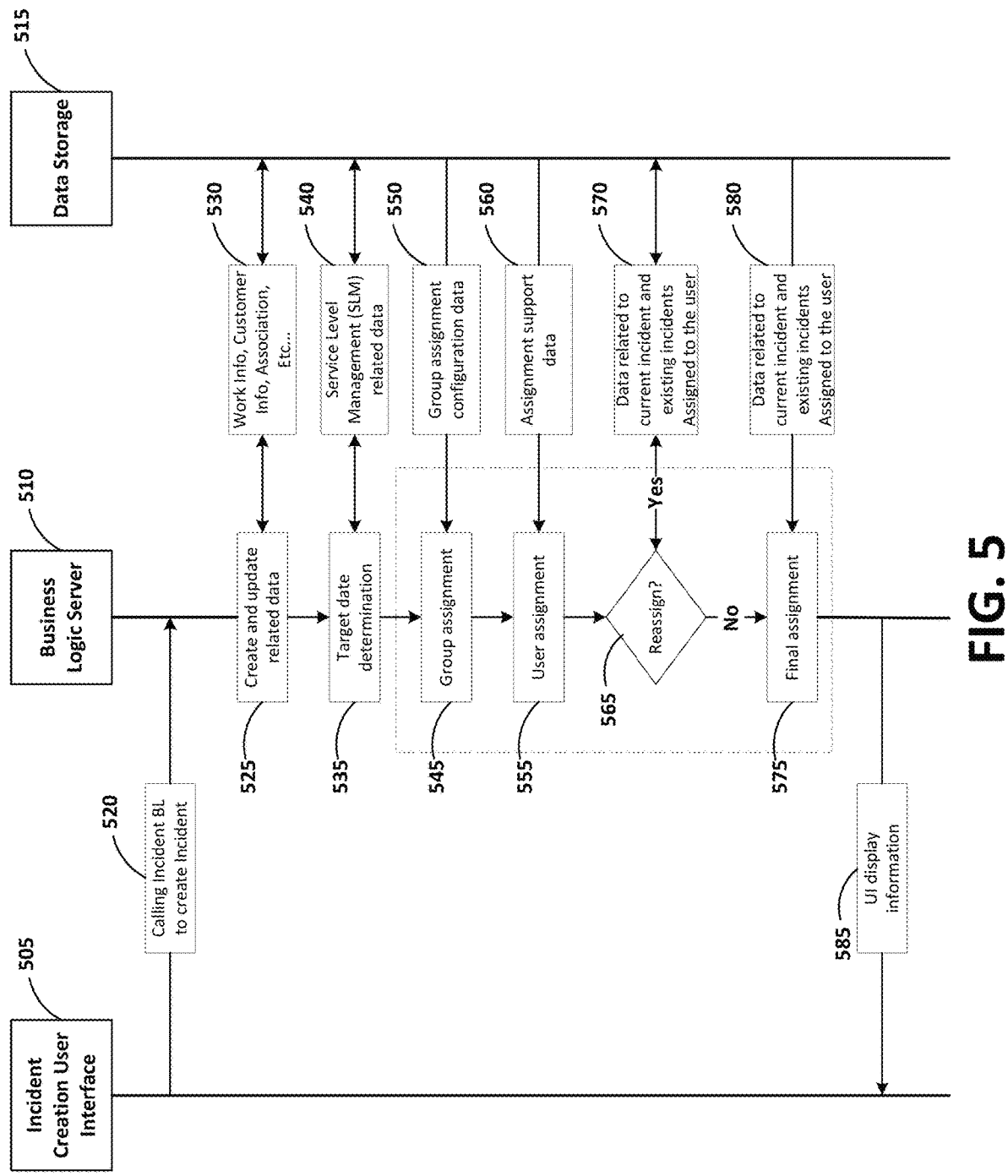
FIG. 5 illustrates a signal flow diagram for ticket assignment according to one or more example embodiments.

FIG. 5 illustrates a signal flow diagram for ticket assignment according to one or more example embodiments. The blocks described with regard to FIG. 5 may be executed as software code stored in a memory (e.g., at least one memory 1010) associated with a system (e.g., as shown in FIG. 10) and executed by at least one processor (e.g., at least one processor 1005) associated with the system. For example, the processor may be associated with one or more of the blocks (e.g., blocks 505, 510, 515) or the apparatus 1000. However, alternative embodiments are contemplated such as a system embodied as a special purpose processor.

For example, the blocks may be performed by an application-specific integrated circuit, or ASIC. For example, the ASIC may be configured as one or more of the blocks (e.g., blocks 505, 510, 515) and/or the apparatus 1000. Although the blocks described below are described as being executed by a processor, the blocks are not necessarily executed by a same processor. In other words, at least one processor may execute the blocks described below with regard to FIG. 5.

As shown in FIG. 5, an incident creation user interface 505, a business logic server 510 and a data storage 515 may operate together to assign a ticket to a user (e.g., a service technician). The incident creation user interface 505, the business logic server 510 and the data storage 515 may be communicatively coupled via, for example, the internet and/or an intranet. The incident creation user interface 505 may be a user interface operating on a client (e.g., personal) computer.

The data storage 515 may store data associated with ticket assignment rules. The ticket assignment rules may include rules associated with assigning tickets by target date, workload of a user or agent, location of a group, user or agent, skill set of a user or agent, priority of the ticket and/or the like. The data storage 515 may store data associated with user or agent availability, user or agent location, user or agent skill set, user or agent capacity, estimating ticket repair time, and the like.

The business logic server 510 may include functions to perform ticket queue assignment, ticket queue ordering, and group assignment. The business logic server 510 may include functions to update data stored on the data storage 515. For example, the business logic server may be configured to determine and store data associated with user or agent availability, user or agent location, user or agent skill set, user or agent capacity, estimating ticket repair time, and the like. The business logic server 510 may include functions to perform ticket queue reassignment suggestions and ticket queue reordering suggestions.

The business logic server 510 may be configured to assign tickets based on rules including ticket resolution target date, workload of a user or agent, location of a group, user or agent, skill set of a user or agent, priority of the ticket and/or the like. The business logic server 510 may be configured to handle exceptions or errors. For example, the business logic server 510 may be configured to enable a manager to assign tickets manually or include a "fallback" rule to handle the abnormal situation in order to guarantee an assignment match.

As shown in FIG. 5, in block 520 the incident creation user interface 505 communicates a calling of the incident business logic to the business logic server 510 in order to create an incident. For example, a call desk may receive a call from a client indicating a problem. The call desk may enter the problem into the incident creation user interface 505 which may generate information about the problem. The incident creation user interface 505 may communicate the information to the business logic server 510. Upon receipt of the information (e.g., calling of the incident business logic) the business logic server 510 creates an incident resulting in creation of a ticket.

In block 525 the business logic server 510 creates and updates data related to the incident. For example, calling of the incident business logic in block 520 may include communicating information about the incident on which the ticket is based. For example, the information may include the problem, customer information, information about the work to be performed, associations between the customer and, for example, service agreements, and the like. The information may be used to create a new ticket including creation of a new data record and possibly updating existing data. Updating existing data may include, for example, updating customer information and/or linking the new data record to another (open or closed) data record for a previously created incident/ticket. In block 530 the business logic server 510 and the data storage 515 communicate work information, customer information, associations, and the like between each other.

In block 535 the business logic server 510 determines a target date for resolving the incident. For example, the target date may be a date (and time) by which the ticket based on the incident is to be resolved. The target date may be based on, for example, a service level agreement, time to resolution for similar incidents, a customer request date and the like. In block 540 the business logic server 510 and the data storage 515 communicate service level management (SLM) related data between each other. The SLM related data may include, for example, a service level agreement, and time to resolution for similar incidents.

In block 545 the business logic server 510 determines a group assignment. For example, one or more agents may be assigned to groups. The groups may be based on skill sets of the agents, customers, geographic regions, cost, organization needs and the like. Group assignment configuration data may be stored in the data storage 515. Therefore group assignment of a ticket may be based on the type of group. For example, a customer may have contracted for (e.g., in a service level agreement) a dedicated group. If the ticket is for the customer, the ticket may be assigned to the group. For example, a ticket may need to be resolved within eight hours. Therefore, the ticket may be assigned to a group that is in a geographic region that is just beginning a work shift. In block 550 the data storage 515 communicates group assignment configuration data to the business logic server 510 for use in determining the group assignment for the ticket.

In block 555 the business logic server 510 determines a user assignment of a ticket for resolving the incident. For example, as discussed above, ticket assignment to a user (e.g., an agent) may be based on a set of stored rules. The rules may be stored in a memory (e.g., a database) including an ordered list of ticket assignment rules. The rules may include rules based on dates (e.g., due dates), location, priority, and the like.

For example, ticket assignment may be based on metrics. The metrics may be stored in a memory (e.g., a database) including assignment result metrics. For example, the metrics may include information about an agent's capacity (availability or skill set) to resolve the problem. For example, the metrics may include information about how well an agent resolved a similar system problem in the past. Accordingly, example embodiments may assign a ticket to a user based on information associated with the ordered list of ticket assignment rules and assignment result metrics. In block 560 the data storage 515 communicates assignment support data to the business logic server 510. For example, as discussed above, assignment support data may include ticket assignment rules and assignment result metrics.

In block 565 the business logic server 510 determines if a user reassignment is required (or requested). For example, user reassignment (to a ticket) may be necessitated by not reaching organization goals based on the collected metrics described above. In other words, if organization goals (e.g., workload balance, percent resolution on time, kick back rate, and the like) are not being met, users may be reassigned tickets to meet the organization goals (e.g., to rebalance workload). For example, user reassignment (to a ticket) may be initiated by a manager. For example, a manager of a group may initiate user reassignment based on receiving a message indicating a match exception (e.g., see FIG. 3 above) due to no users matching a primary ticket assignment rule(s) for a new ticket. The user reassignment may initiate a new process (e.g., described in FIG. 7 below). Alternatively, ticket reassignment may return processing to block 555. Ticket reassignment may be based on data stored in data storage 515. For example, in block 570 the business logic server 510 and the data storage 515 communicate data related to current incident and existing incidents assigned to the user between each other for use in ticket reassignment.

In block 575 the business logic server 510 generates a final assignment of a ticket for resolving the incident. For example, upon completion of blocks 555 and 565, the ticket has been assigned to a user (e.g., agent). Therefore, the ticket can be indicated as finally assigned to the user. In block 580 the data storage 515 communicates data related to current incident and existing incidents assigned to the user to the business logic server 510. The data may include the indication of final assignment of the ticket to the user.

In block 585 the business logic server 510 communicates user interface display information to the incident creation user interface 505. For example, the display information may include the user (or agent) assigned to resolve the ticket, information about the ticket (e.g., ticket ID), target resolution date (and time), and the like. The incident creation user interface 505 may display the display information on a display associated with the incident creation user interface 505.

Figure 6:
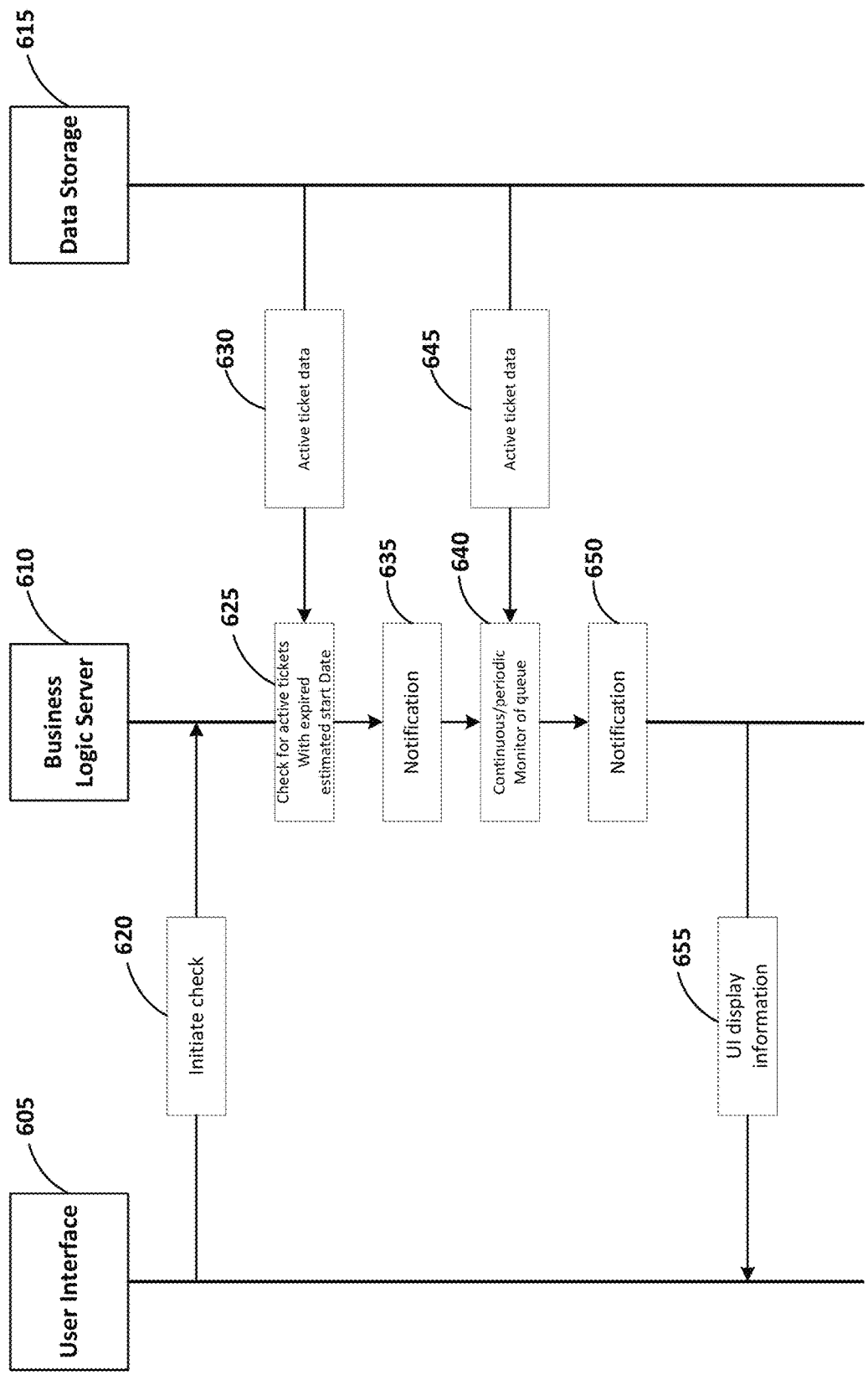
FIG. 6 illustrates a signal flow diagram for checking for active tickets with expired estimated start dates according to one or more example embodiments.

FIG. 6 illustrates a signal flow diagram for checking for active tickets with expired estimated start dates according to one or more example embodiments. The blocks described with regard to FIG. 6 may be executed as software code stored in a memory (e.g., at least one memory 1010) associated with a system (e.g., as shown in FIG. 10) and executed by at least one processor (e.g., at least one processor 1005) associated with the system. For example, the processor may be associated with one or more of the blocks (e.g., blocks 605, 610, 615) or the apparatus 1000. However, alternative embodiments are contemplated such as a system embodied as a special purpose processor.

For example, the blocks may be performed by an application-specific integrated circuit, or ASIC. For example, the ASIC may be configured as one or more of the blocks (e.g., blocks 605, 610, 615) and/or the apparatus 1000. Although the blocks described below are described as being executed by a processor, the blocks are not necessarily executed by a same processor. In other words, at least one processor may execute the blocks described below with regard to FIG. 6.

As shown in FIG. 6, a user interface 605, a business logic server 610 and a data storage 615 may operate together to assign a ticket to a user (e.g., a service technician). The user interface 605, the business logic server 610 and the data storage 615 may be communicatively coupled via, for example, the internet and/or an intranet. The user interface 605 may be a user interface operating on a client (e.g., personal) computer.

As shown in FIG. 6, in block 620 the user interface 605 communicates an initiate check to the business logic server 610. The initiate check may be associated with detecting a breach associated with resolving at least one assigned ticket. For example, checking for active tickets with expired estimated start dates may be initiated by a manager. For example, a manager of a group may initiate active tickets with expired estimated start dates based on organizational goals. The manager may initiate a check on a daily or regular time basis. The manager may utilize a user interface operating on a client computer to initiate a check. Upon initiating the check, the user interface 605 may communicate a message to the business logic server requesting the check for active tickets with expired estimated start dates.

In block 625 the business logic server 610 performs a check for active tickets with expired estimated start dates. For example, the business logic server 610 may request and receive active ticket data (block 630) from the data storage 615. The active ticket data may include data related to current incident and existing incidents assigned and not assigned to users. For example, active ticket data may include a master queue of unresolved trouble tickets. The business logic server 610 may generate a list of active tickets with expired estimated start dates. For example, the business logic server 610 may filter out (exclude from) the active ticket data all (most or a subset of) tickets with an estimated start date (and time) after the current date (and time) in order to generate the list of active tickets with expired estimated start dates.

In block 635 the business logic server 610 generates a notification. For example, the notification may include the list of active tickets with expired estimated start dates. The notification may be in the form of a message including the list of active tickets with expired estimated start dates.

If an organization experiences capacity issues, continuous monitoring the queue (e.g., data from active ticket data block 645) in block 640 may result in proactively alerting/notifying (e.g., block 650) a manager (e.g., a manager of a group) as a background process. The manager may be presented with a user interface to get an understanding of the current situation. In addition, based on some pre-configured assignment rules, capacity of the agents, as well as the metric collector's data, example embodiments may provide suggestions to the manager on how to reshuffle the tickets. Thus reducing an amount of time to understand the situation, as well as determining how the workload should be reorganized.

In block 650 the business logic server 610 communicates user interface display information (e.g., notification information associated with block 635 and block 650) to the user interface 605. For example, the business logic server 610 may communicate the message including the list of active tickets with expired estimated start dates as well as other user interface data. The user interface 605 may display the display information on a display associated with the user interface 605.

Example embodiments may allow configuration of the queue to be reorganized based on, for example, reassignments, movement of technical staff, availability (now and future) of the technical staff, re-categorization of the ticket, and/or management of "Follow-the-Sun" support (e.g., passing tickets between work sites that are many time zones apart so that the ticket is continually worked on until resolved).

Continuous monitoring of the system and providing proactive changes and recommendations for the manager may proactively alert the manager (and the user or agent assigned to the ticket) on any potential breaching situations. Continuous monitoring of the system may provide a learning system (e.g., collecting metrics) that tracks and predicts, over time, how long certain tasks (e.g., leading to resolution of a ticket) may take based on the task and the people/groups assigned to the task. Continuous monitoring of the system may help determine skill levels based on the work completed and the quality of that work, and could possibly integrate with gamification point system to help determine capability rating.

A user interface (UI) (e.g., a manager UI) may be designed to allow a manager to override queue computations if desired. The UI may allow a manager user to monitor and re-assign tickets that may be currently assigned to the manager's group.

Figure 7:
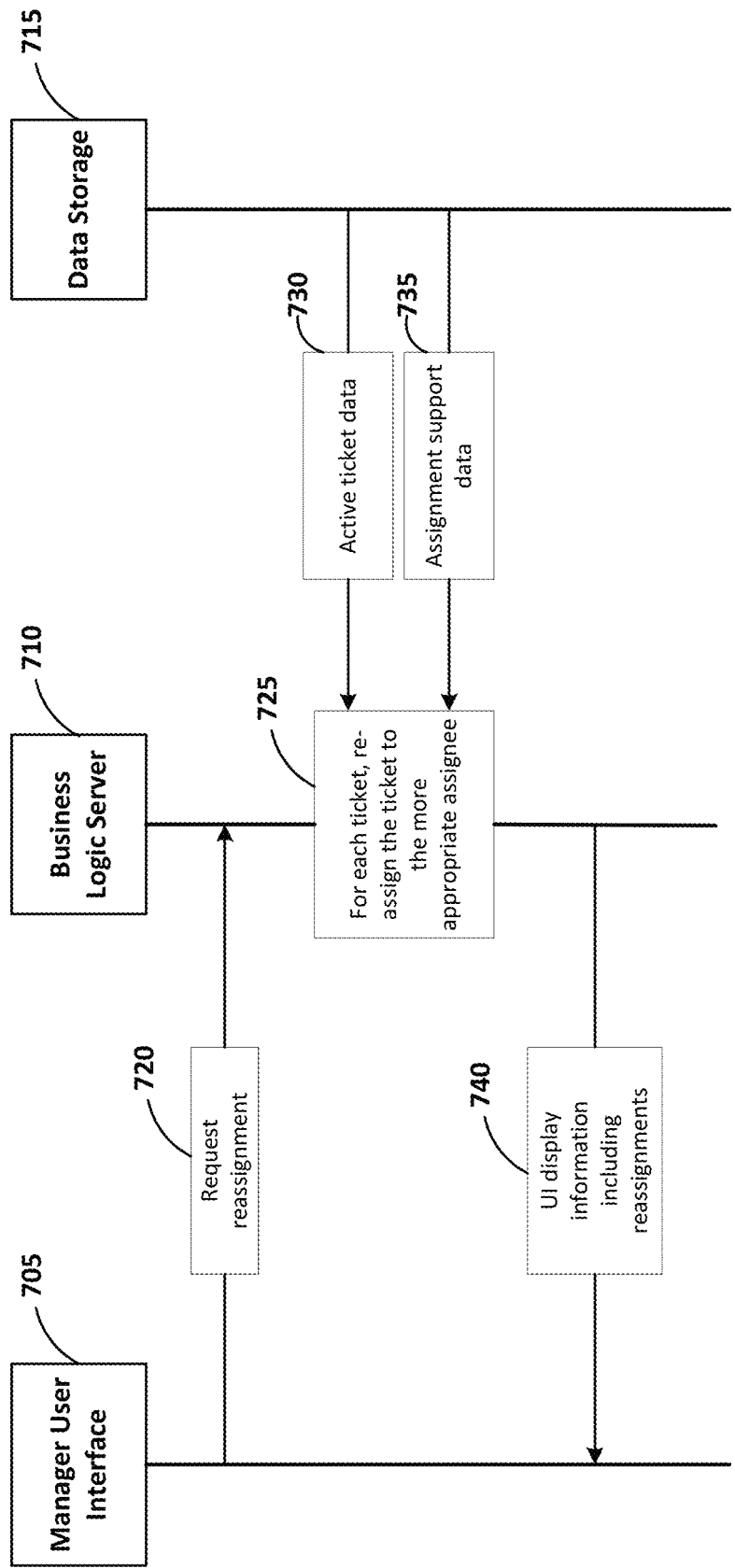
FIG. 7 illustrates a signal flow diagram for ticket reassignment according to one or more example embodiments.

FIG. 7 illustrates a signal flow diagram for ticket reassignment according to one or more example embodiments. The blocks described with regard to FIG. 7 may be executed as software code stored in a memory (e.g., at least one memory 1010) associated with a system (e.g., as shown in FIG. 10) and executed by at least one processor (e.g., at least one processor 1005) associated with the system. For example, the processor may be associated with one or more of the blocks (e.g., blocks 705, 710, 715) or the apparatus 1000. However, alternative embodiments are contemplated such as a system embodied as a special purpose processor.

For example, the blocks may be performed by an application-specific integrated circuit, or ASIC. For example, the ASIC may be configured as one or more of the blocks (e.g., blocks 705, 710, 715) and/or the apparatus 1000. Although the blocks described below are described as being executed by a processor, the blocks are not necessarily executed by a same processor. In other words, at least one processor may execute the blocks described below with regard to FIG. 7.

As shown in FIG. 7, a manager user interface 705, a business logic server 710 and a data storage 715 may operate together to assign a ticket to a user (e.g., a service technician). The manager user interface 705, the business logic server 710 and the data storage 715 may be communicatively coupled via, for example, the internet and/or an intranet. The manager user interface 705 may be a user interface operating on a client (e.g., personal) computer.

As shown in FIG. 7, in block 720 the manager user interface 705 communicates a request for reassignment to the business logic server 710. For example, user reassignment (to a ticket) may be initiated by a manager. For example, a manager of a group may initiate user reassignment based on receiving a message indicating a match exception (e.g., see FIG. 3 above) due to no users matching a primary ticket assignment rule(s) for a new ticket. Further, continuous monitoring of the system may alert the manager to a potential breaching situation (e.g., an assignment that is a condition that does not meet organizational goals). For example, the manager may be alerted to one or more active tickets with expired estimated start dates as described above. Accordingly, the manager may decide to utilize the manager user interface 705 to communicate a request for reassignment (block 720) to the business logic server 710.

In block 725 the business logic server 710 assigns ticket(s) to a more appropriate assignee. For example, the business logic server 710 may perform the steps described above in more detail with regard to FIGS. 1-4. For example the business logic server 710 may acquire active ticket data (block 730) from the data storage 715. The active ticket data may include data related to current incident and existing incidents assigned and not assigned to users. For example, active ticket data may include a master queue of unresolved trouble tickets.

In block 735 the data storage 715 communicates assignment support data to the business logic server 710. For example, the assignment support data may include a set of rules for ticket assignment and metrics. For example, the business logic server 710 may assign tickets based on the set of rules for ticket assignment. The rules may be stored in a memory (e.g., a database) including an ordered list of ticket assignment rules. The rules may include rules based on dates (e.g., due dates), location, priority, and the like.

For example, the business logic server 710 may assign tickets based on the metrics. The metrics may be stored in a memory (e.g., a database) including assignment result metrics. For example, the metrics may include information about an agent's capacity (availability or skill set) to resolve the problem. For example, the metrics may include information about how well an agent resolved a similar system problem in the past. Accordingly, the business logic server 710 may assign tickets based on information associated with the ordered list of ticket assignment rules (and the assignment result metrics.

In block 740 the business logic server 710 communicates user interface display information including reassignments to the manager user interface 705. For example, the business logic server 710 may communicate the ticket reassignments. For example, the business logic server 710 may communicate a message including the ticket reassignments as well as other user interface data. The manager user interface 705 may display the display information on a display associated with the manager user interface 705. The manager user interface 705 may include functionality to accept or decline the ticket reassignments. For example, the manager user interface 705 may allow the manager to override the ticket reassignments if desired.

Figure 8A:
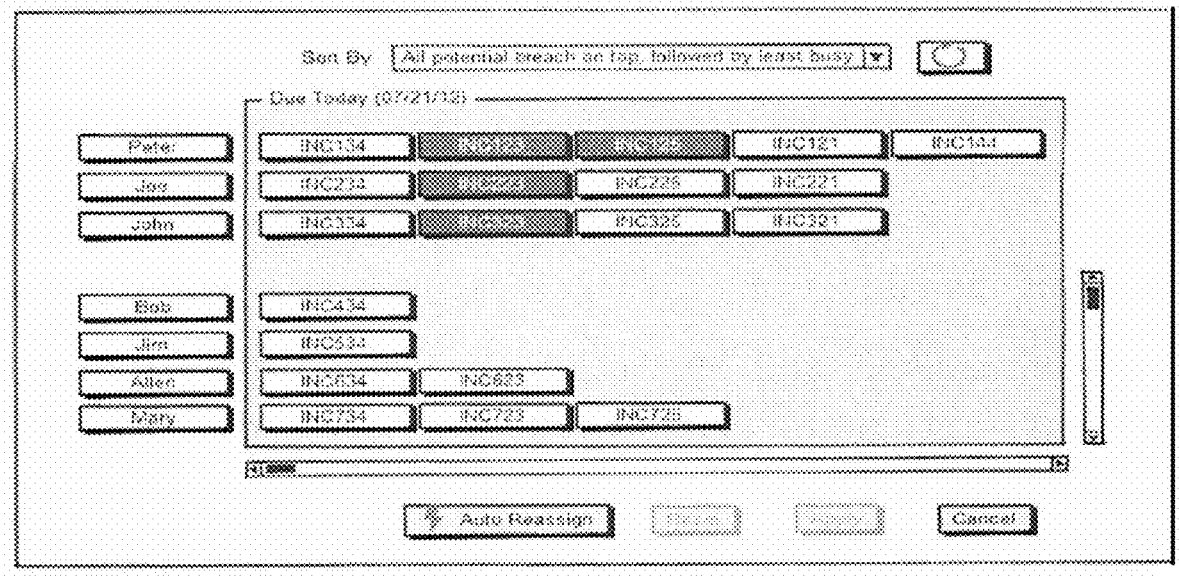
FIGS. 8A and 8B illustrate a manager user interface according to one or more example embodiments.
Figure 8B:
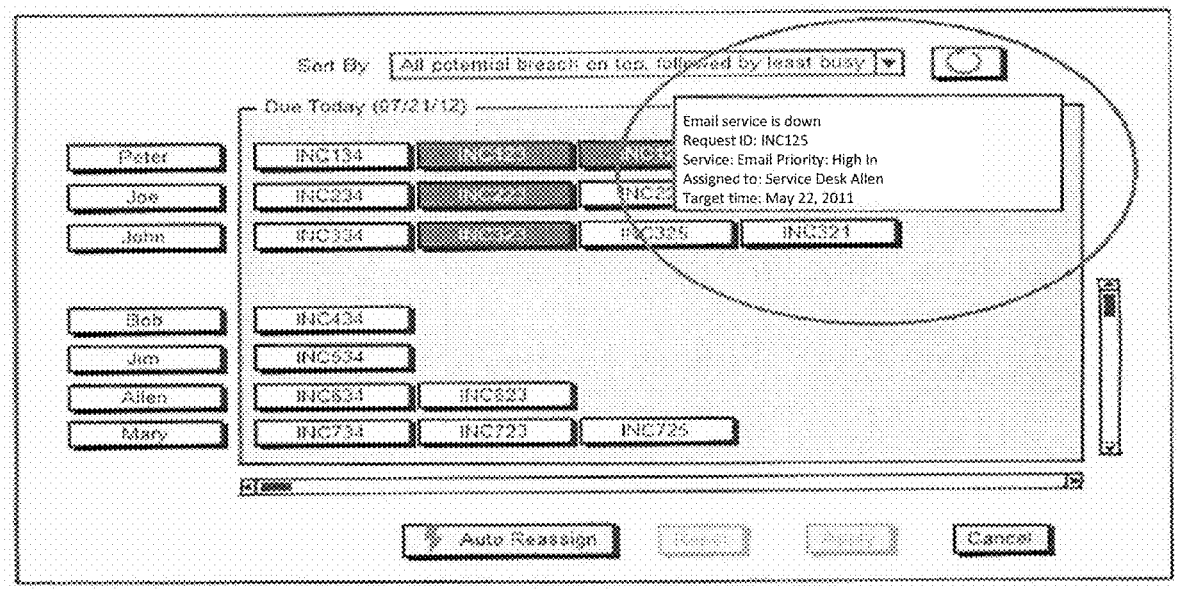

FIGS. 8A and 8B illustrate a manager user interface according to one or more example embodiments. As shown in FIG. 8A, the manager user interface provides a grid of users or agents as well as the tickets currently assigned to the users. Tickets assigned to each user may also be ordered based on, for example, estimated start date. In this example the system detects that there may be four tickets with potential breaching issues (determined as described above); and they may be highlighted in such a way to alert the manager. For example, the tickets with potential breaching issues may be highlighted in red to alert the manager.

The manager user interface may provide sorting functions. For example, in FIG. 8A a 'Sort By' option is illustrated as a specific sorting order option called "All potential breach on top, followed by least busy users". The 'Sort By' option may tailored for management by listing all the users with potential breaching tickets on top, followed by least busy users. The 'Sort By' option may allow the manager to easily re-assign tickets from the busiest users to the least busy users. Other standard options such as sort by name, workload may also be provided.

As shown in FIG. 8B, the manager user interface may also view the summary of the ticket by mouse over to the ticket of interest. A quick way to understand more about the ticket without the need to open the ticket.

According to example embodiments, features of the manager user interface may allow the manager to easily re-arrange workload among the group and, at the same time, maintain a good visual understand of the workload before and after the arrangement. This can be done via simple drag and drop action on the ticket from one user to the other (e.g., as a manual reassignment). From there, the assignment engine may be called to 'simulate' the reassignment situation. The term 'simulation' is used here because at this point, no changes have been committed. The manager can continue to drag and drop the tickets until he/she is satisfied with the new arrangement, and hit the "apply" button to commit the changes. If the assignment engine detects potential breaching situation after the re-assignment, the manager may be warned immediately so that the manager can review the situation and refine the decision.

To simplify the manager's work even further, the manager user interface may also be equipped with an "Auto Reassign" button. This button allows the system to auto-reassign tickets (e.g., as described in FIG. 7), based on the same pre-defined assignment rules, to rectify any potential breaching situations. Utilizing the "Auto Reassign" button, the manager user interface may automatically provide suggestions to the manager of a new assignment arrangement. The display may show the potential breaching tickets in red in order to give the manager an idea where the breaching tickets go (e.g., reassigned users or agents). The manager user interface may provide the manager with a chance to review the change, and re-arrange them if desired before committing the change.

Figure 9:
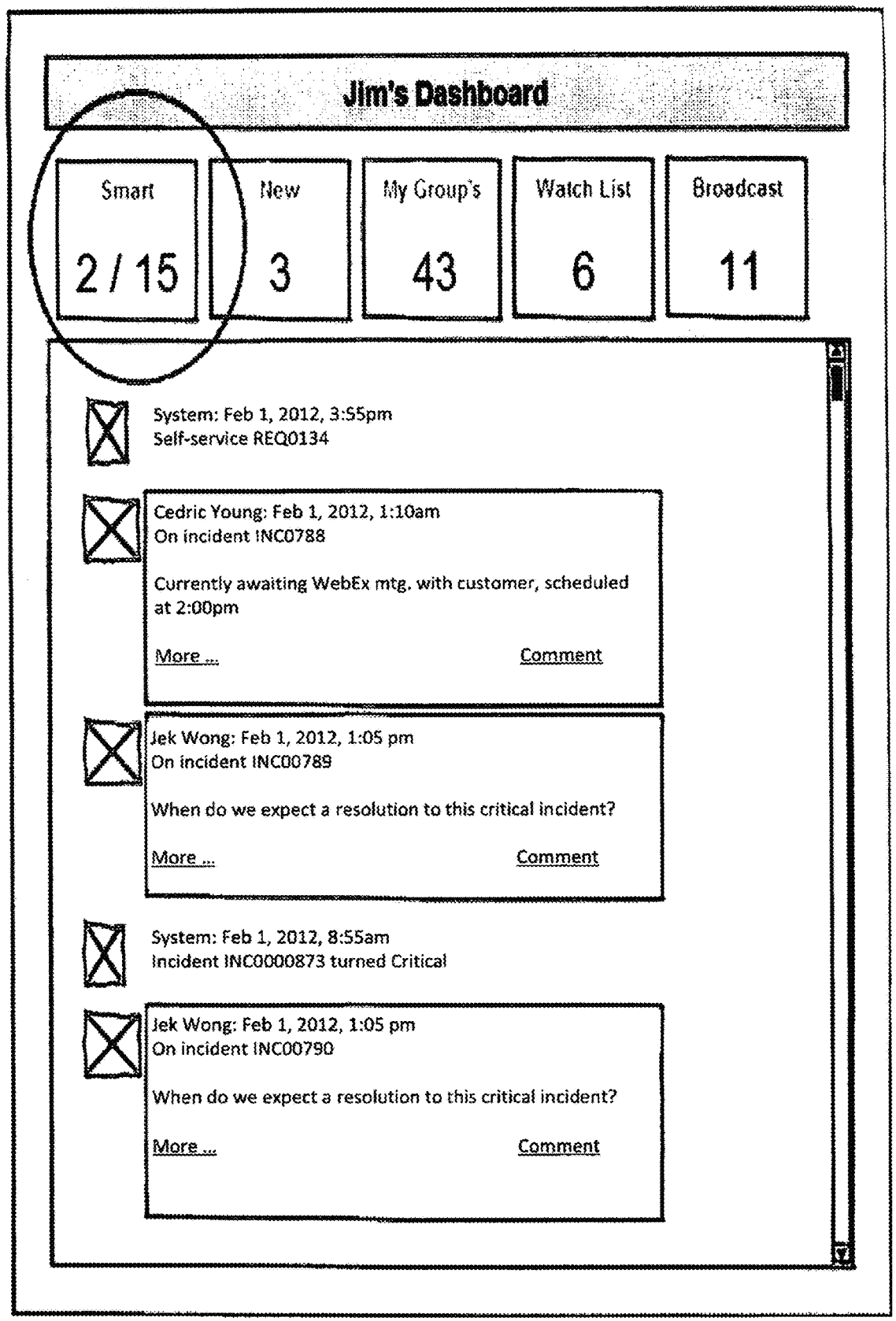
FIG. 9 illustrates a user interface for ticket assignment according to one or more example embodiments.

FIG. 9 illustrates a user interface for ticket assignment according to one or more example embodiments. The user interface may be configured to provide information to the user. For example, the information may include the number of tickets that may be due today and the total number of tickets assigned to the user so far. As shown in FIG. 9, the number of tickets that may be due today and the total number of tickets assigned to the user so far corresponds to the number 2 and 15 respectively. The user interface may be designed to be presented to the users after logon. This provides user first hand information about the workload ahead of the day.

A user may utilize the user interface to drill down to see the full list of the tickets by, for example, double clicking some element on the user interface. From there, the detail section of the user interface may be presented with a list of tickets ordered based on a queue ordering (e.g., an 'estimated start date' on the ticket). Tickets that may be due today may also be indicated or flagged accordingly.

As described above, tickets assigned to the user may be auto-ordered based on some pre-defined organization objectives. For example, an organization may decide to order ticket based on target date, followed by priority. Other organizations may want to order by priority, followed by capacity. In any cases, once the organizational rule is defined, as described above, the ticket is assigned based on these pre-defined rules. The user interface may display each assigned ticket with the estimated start date. The order of the tickets, as displayed on the user interface, may be based on the estimated start date. Therefore, user or agent may no longer be required to scan through each new ticket assigned to him/her in order to find out which ticket to work on first. Users can now focus on their work by simply following the displayed order.

FIG. 10 illustrates a block diagram of an apparatus according to at least one example embodiment. As shown in FIG. 10, the apparatus 1000 includes at least one processing unit 1005, at least one memory 1010, and a ticket assignment queue management module 1015. The at least one processing unit 1005, the at least one memory 1010, and the ticket assignment queue management module 1015 are communicatively coupled via bus 1025. The apparatus 1000 may be, for example, an element of business logic server 510, 610, 710.

In the example of FIG. 10, the apparatus 1000 may be at least one computing device and should be understood to represent virtually any computing device configured to perform the methods described herein. As such, the apparatus 1000 may be understood to include various standard components which may be utilized to implement the techniques described herein, or different or future versions thereof. By way of example, the apparatus 1000 is illustrated as including the at least one processing unit 1005, as well as at least one memory 1010 (e.g., a computer readable storage medium).

Thus, as may be appreciated, the at least one processing unit 1005 may be utilized to execute instructions stored on the at least one memory 1010, so as to thereby implement the various features and functions described herein, or additional or alternative features and functions. Of course, the at least one processing unit 1005 and the at least one memory 1010 may be utilized for various other purposes. In particular, it may be appreciated that the at least one memory 1010 may be understood to represent an example of various types of memory and related hardware and software which might be used to implement any one of the modules described herein. Systems and/or methods described below may include data and/or storage elements. The data and/or storage elements (e.g., data base tables) may be stored in, for example, the at least one memory 1010.

The ticket assignment queue management module 1015 may be stored on the at least one memory 1010. For example, the ticket assignment queue management module 1015 may be a plugin software stored on the at least one memory 1010. The ticket assignment queue management module 1015 may store data and/or code that when executed by the at least one processing unit 1005 performs the functions associated with the ticket assignment queue management module 1015. Alternatively, or in addition to, the ticket assignment queue management module 1015 may be an application-specific integrated circuit, or ASIC. For example, the ASIC may be configured as one or more of the module, or elements of the modules, of the ticket assignment queue management module 1015. The ticket assignment queue management module 1015 may be a standalone hardware module including a processor (not shown) configured to perform the associated functions.

The ticket assignment queue management module 1015 may include various modules configured to perform the methods described herein. The ticket assignment queue management module 1015 may include an assignment module 1025, an escalation module 1030, a reassignment module 1035, a configuration module 1040, and a monitoring module 1045. The ticket assignment queue management module 1015 may be configured to perform at least a portion of the methods described above. For example, the ticket assignment queue management module 1015 may be configured to assign tickets to users or agents based on ticket assignment rules and metrics, monitor and maintain metrics associated with the ticket assignments and reassign tickets as desired, and provide information to user interfaces.

The assignment module 1025 may be configured to receive a ticket indicating a system problem, assign the ticket based on an ordered list of ticket assignment rules, the system problem and assignment result metrics.

The escalation module 1030 may be configured to determine an issue(s) (e.g., a breach of or failure to meet an organizational goal or requirement (e.g., completion date) associated with the ticket) with ticket assignments and make a manager and/or user aware of the issue(s). For example, the escalation module 1030 may be configured to notify a manager of active tickets with expired estimated start dates. In order to monitor the ticket assignment queue status, an escalation may be developed to look for any potential breaching tickets. The escalation may be configured to look for tickets with expired (or about to expire) "estimated start time". The escalation module 1030 may be configured to look monitor missed "estimated start time" instead of "target date" because the "estimated start time" is the time the user or agent is supposed to start working on the ticket in order to meeting the "target date". The estimated start time may be earlier in time than the "target date" due to factors such as priority, user schedule, and the like.

The reassignment module 1035 may be configured to reassign ticket(s) to a more appropriate assignee (e.g., user or agent). For example, tickets may be reassigned based on a request from a manager. For example tickets may be reassigned based on a determination that an organizations goal(s) are not being met. For example, tickets may be reassigned if workload is not balanced.

The configuration module 1040 may be configured to manage configuration data associated with ticket assignment. For example, the configuration module may manage the ticket assignment rules and data associated with ticket assignment result metrics. The monitoring module 1045 may be configured to monitor assigned tickets, generate metrics associated with the assigned tickets and save the metrics to memory. For example, a positive metric or a negative metric may be assigned. For example, a user or agent with a low reassignment rate (e.g., does not have tickets taken away and assigned to another user or agent) may be given a positive metric. For example, a user or agent with a high reassignment rate (e.g., has tickets taken away and assigned to another user or agent at non-desired numbers) may be given a positive metric. For example, a user or agent with a low ticket kickback rate (e.g., does not have new tickets generated based on previously resolved incidents) may be given a positive metric. For example, a user or agent with a ticket high kickback rate (e.g., has new tickets generated based on previously resolved incidents at non-desired numbers) may be given a positive metric. Metrics may also be based on a comparison of an actual elapsed time for resolving the system problem by the user and the predicted elapsed time for resolving the system problem.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method for eliminating queues of assigned information technology (IT) system incident tickets to resolve IT system problems, the method comprising:
   maintaining at least one data structure, the at least one data structure including:
      an ordered list of incident ticket assignment rules, and
      assignment result metrics characterizing agent-specific assignment results of previous incident tickets previously resolved by at least one of a plurality of agents, the assignment result metrics including at least one of a reassignment rate and a kick-back rate;
      a master queue of incident tickets, in which the incident tickets are ordered for resolution and assigned among the plurality of agents based on predictions of a self-learning prediction mechanism configured to predict future assignment result metrics, based on IT system problems causing the incident tickets, the ordered list of incident ticket assignment rules, and the assignment result metrics;
   receiving a first incident ticket indicating a first IT system problem, the first incident ticket having a target resolution time for resolving the first IT system problem;
   predicting future assignment result metrics for the first incident ticket for the at least one of the plurality of agents, using a prediction algorithm of the self-learning prediction mechanism and the first incident ticket, including executing the prediction algorithm with at least one processor to predict a first future assignment result metric corresponding to a first agent;
   assigning the first incident ticket to the first agent based on the predicting of the first future assignment result metric from among the future assignment result metrics for the first incident ticket for the at least one of the plurality of agents;
   monitoring a resolution of the first incident to obtain an actual first assignment result metric;
   receiving the actual first assignment result metric for comparison with the predicted first future assignment result metric;
   automatically updating the self-learning prediction mechanism based on the comparison of the actual first assignment result metric with the predicted first future assignment result metric, including adjusting, by the at least one processor, the prediction algorithm;
   re-ordering the master queue of incident tickets, based on the updated self-learning prediction mechanism;
   receiving a second incident ticket indicating a second IT system problem, the second incident having a target resolution time for resolving the second IT system problem;
   predicting future assignment result metrics for the second incident ticket for the plurality of agents, using the adjusted prediction algorithm of the updated self-learning prediction mechanism and the second incident ticket, including executing the updated prediction algorithm with the at least one processor to predict a second future assignment result metric corresponding to a second agent; and
   assigning the second incident ticket to the second agent based on the predicting of the second future assignment result metric from among the future assignment result metrics for the second incident ticket for the plurality of agents.

2. The method of claim 1, wherein the ordered list of ticket assignment rules includes a primary rule.

3. The method of claim 2, wherein the primary rule is based on at least one of a completion target, a priority, a work center workload distribution, a skillset, and a location where work is to be performed.

4. The method of claim 1, wherein the at least one data structure is included in a searchable database.

5. The method of claim 1, wherein receiving the first incident ticket indicating the first IT system problem includes,
   storing each of a plurality of unresolved incident tickets in the master queue of incident tickets, wherein assigning the first incident ticket includes,
   sorting the master queue of incident tickets based on the ordered list of ticket assignment rules and on the self-learning prediction mechanism,
   selecting the first incident ticket from the sorted master queue of incident tickets, and
   assigning the first incident ticket to the first agent.

6. The method of claim 1, further comprising using the assignment result metric to determine a start time and an end time associated with resolving the first IT system problem by the first agent.

7. The method of claim 1, further comprising:
   monitoring incident ticket reassignments,
   assigning a positive assignment result metric for a low reassignment rate;
   assigning a negative assignment result metric for a high reassignment rate; and
   revising, at a target interval, the assignment result metrics based on the monitoring of the incident ticket reassignments.

8. The method of claim 7, wherein the monitoring further includes:
   monitoring the kick-back rate,
   assigning a positive metric for a low kick-back rate, and
   assigning a negative metric for a high kick-back rate.

9. The method of claim 1, further comprising:
   detecting a breach associated with resolving the assigned first incident ticket;
   notifying a management entity of the breach; and
   performing an incident ticket reassignment.

10. A system for eliminating queues of assigned information technology (IT) system incident tickets to resolve the IT system problems, the system including a non-transitory computer readable medium including code segments that when executed by at least one processor cause the at least one processor to:
    maintain at least one data structure, the at least one data structure including:
       an ordered list of ticket assignment rules, and
       assignment result metrics characterizing agent-specific assignment results of previous incident tickets previously resolved by at least one of a plurality of agents, the assignment result metrics including at least one of a reassignment rate and a kick-back rate;
       a master queue of incident tickets, in which the incident tickets are ordered for resolution and assigned among the plurality of agents based on predictions of a self-learning prediction mechanism configured to predict future assignment result metrics, based on IT system problems causing the incident tickets, the ordered list of incident ticket assignment rules, and the assignment result metrics;
    receive a first incident ticket indicating a first IT system problem, the first incident ticket having a target resolution time for resolving the first IT system problem;

predict future assignment result metrics for the first incident ticket for the at least one of the plurality of agents, using a prediction algorithm of the self-learning prediction mechanism and the first incident ticket, including executing the prediction algorithm with at the least one processor to predict a first future assignment result metric corresponding to a first agent;

assign the first incident ticket to the first agent based on the predicting of the first future assignment result metric from among the future assignment result metrics for the first incident ticket for the at least one of the plurality of agents;

monitor a resolution of the first incident to obtain an actual first assignment result metric;

receive the actual first assignment result metric for comparison with the predicted first future assignment result metric;

automatically update the self-learning prediction mechanism based on the comparison of the actual first assignment result metric with the predicted first future assignment result metric, including adjusting, by the at least one processor, the prediction algorithm;

re-order the master queue of incident tickets, based on the updated self-learning prediction mechanism;

receive a second incident ticket indicating a second IT system problem;

predict future assignment result metrics for the second incident ticket for the plurality of agents, using the adjusted prediction algorithm of the updated self-learning prediction mechanism and the second incident ticket, including executing the updated prediction algorithm with the at least one processor to predict a second future assignment result metric corresponding to a second agent; and assign the second incident ticket to the second agent based on the predicting of the second future assignment result metric from among the future assignment result metrics for the second incident ticket for the plurality of agents.

11. The system of claim 10, wherein the ordered list of ticket assignment rules includes a primary rule.

12. The system of claim 11, wherein the primary rule is based on at least one of a completion target, a priority, a work center workload distribution, a skillset, and a location where work is to be performed.

13. The system of claim 10, wherein the code segments, when executed by the at least one processor, further cause the at least one processor to:
   detect a breach associated with resolving the first incident ticket;
   notify a management entity of the breach; and
   perform a ticket reassignment.

14. The system of claim 10, wherein the code segments, when executed by the at least one processor, further cause the at least one processor to receive the first incident ticket indicating the first IT system problem, including:
   storing each of a plurality of unresolved incident tickets in the master queue of incident tickets,
   sorting the master queue of incident tickets based on the ordered list of ticket assignment rules and on the self-learning prediction mechanism, and
   selecting the first incident ticket from the sorted master queue of incident tickets, and
   assigning the first incident ticket to the first agent.

15. The system of claim 10, further comprising using the assignment result metric to determine a start time period and an end time period associated with resolving the first IT system problem by the first agent.

16. The system of claim 10, wherein the code segments, when executed by the at least one processor, further cause the at least one processor to
   monitor ticket reassignments,
   assign a positive assignment result metric for a low reassignment rate;
   assign a negative assignment result metric for a high reassignment rate; and
   revising, at a target interval, the at least one assignment result metrics based on the monitoring of the ticket reassignments.

17. The system of claim 16, wherein the code segments, when executed by the at least one processor, further cause the at least one processor to:
   monitor the kick-back rate,
   assign a positive metric for a low kick-back rate, and
   assign a negative metric for a high kick-back rate.

18. The system of claim 10, further comprising a manager user interface configured to display incident ticket assignments for the plurality of agents and allow a management entity to rearrange assigned incident tickets.

* * * * *